(No Model.) 2 Sheets—Sheet 1.
H. H. DANIELS.
COMBINATION PADLOCK.
No. 481,551. Patented Aug. 30, 1892.
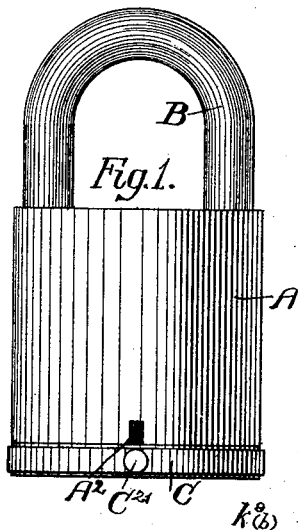
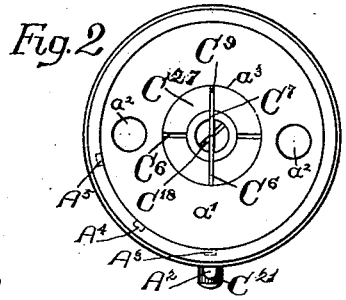
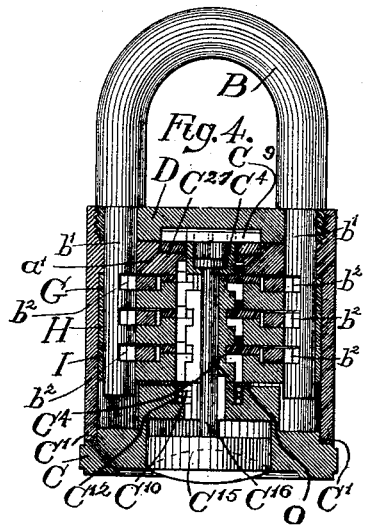
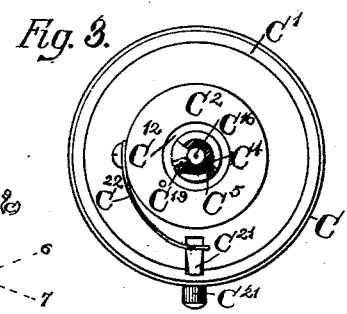
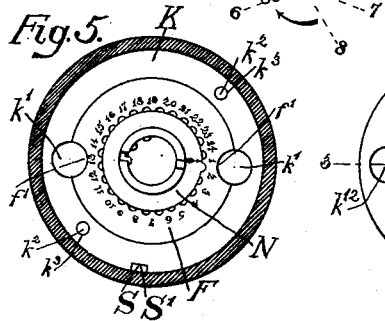
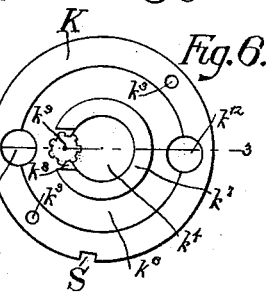
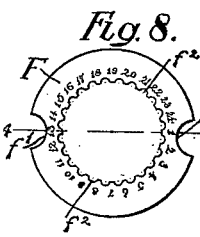
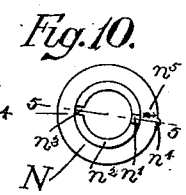
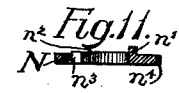
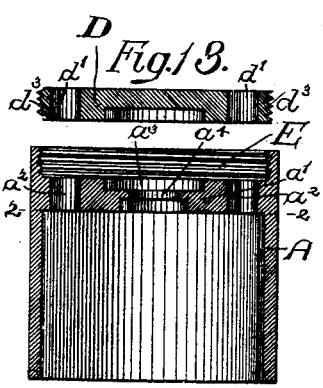
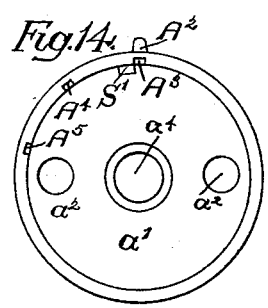
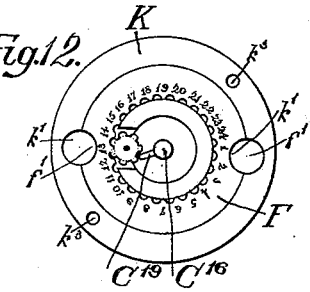
Attest:
N. Smith
Henry Appleton
Inventor:
Henry H. Daniels,
per Wm. Hubbell Fisher,
Attorney.
THE NORRIS PETERS CO., PHOTO-LITHO., WASHINGTON, D. C.

(No Model.) 2 Sheets—Sheet 2.
H. H. DANIELS.
COMBINATION PADLOCK.
No. 481,551. Patented Aug. 30, 1892.
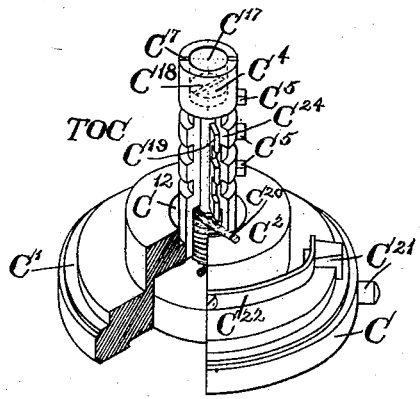
Fig. 16.
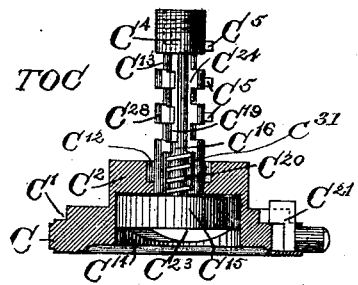
Fig. 17.
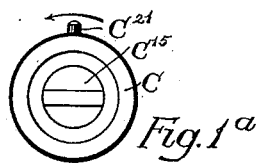
Fig. 1ᵃ
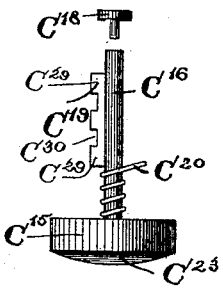
Fig. 20.
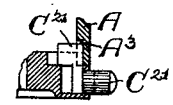
Fig. 22.
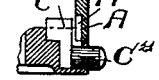
Fig. 23.
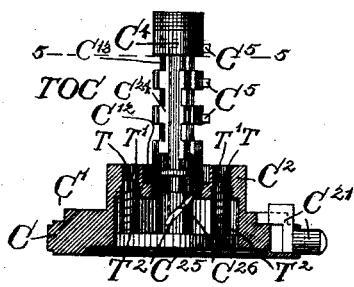
Fig. 18.
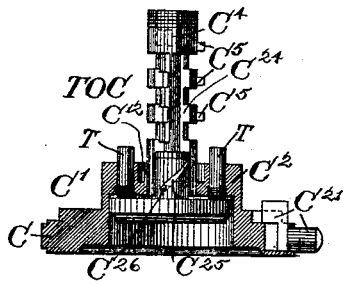
Fig. 19.
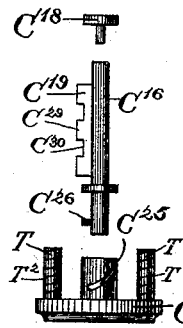
Fig. 21.
Attest:
K. Smith
Henry Appleton
Inventor:
Henry H. Daniels
per Wm. Hubbell Fisher
Attorney.

UNITED STATES PATENT OFFICE.

HENRY H. DANIELS, OF CINCINNATI, OHIO.

COMBINATION-PADLOCK.

SPECIFICATION forming part of Letters Patent No. 481,551, dated August 30, 1892.

Application filed March 25, 1892. Serial No. 426,401. (No model.)

*To all whom it may concern:*

Be it known that I, HENRY H. DANIELS, a citizen of the United States of America, and a resident of the city of Cincinnati, in the county of Hamilton and State of Ohio, have invented certain new and useful Improvements in Combination-Locks, of which the following is a specification.

The several features of my invention and the various advantages resulting from their use, conjointly or otherwise, will be apparent from the following description and claims.

My invention is applicable to various kinds of combination-locks. For the purposes of convenient illustration of my invention I have selected a combination-padlock.

In the accompanying drawings, making a part of this specification, and to which reference is hereby made, Figure 1 represents a side elevation of the padlock embodying my invention. Fig. 1ª is a view of the bottom of the said lock. For economy of space this figure is upon a scale one-half as large as that upon which Fig. 1 is drawn. Fig. 2 is a top view of the shell of a padlock, the cover or locking-disk which fits down upon the said top being removed. Fig. 3 is a top view of the tumbler-operating column, the upper portion being in section, all of that part of the column which is above the plane of the dotted line 5 5 of Fig. 18 being removed. Fig. 4 is a vertical central section of the said padlock, taken in a plane passing through the longitudinal axes of the shanks of the staple, said shanks, as well as the upper part of the staple, being shown in elevation. Fig. 5 is a top view of the tumblers and tumbler-chambers with the outside shell, as seen when the shell is cut in the line 2 2 of Fig. 13, the resetting-column being removed. Fig. 6 is a plan view of the tumbler-chamber with the small pinion attached. Fig. 7 is a section of the tumbler-chamber on the line 3 3 of Fig. 6. Fig. 8 is a plan view of the annular ring of the tumbler. Fig. 9 is a section on the line 4 4 of Fig. 8. Fig. 10 is a plan view of the disk of the tumbler. Fig. 11 is a section through the line 5 5 of Fig. 10. Fig. 12 is a plan view of the tumbler-chamber, of the annular rings of the tumblers in its place, and showing the small pinion in gear with the said annular ring. Fig. 13 is a vertical central section of the shell of the padlock, taken through the longitudinal axes of the openings through which the shanks are respectively passed into the padlock, the top of the padlock being elevated a short distance above the top of the cylindrical portion of the shell, the bottom of the said padlock being altogether absent. Fig. 14 is a bottom view of the padlock-shell. Fig. 15 is a diagram showing the relative positions of the small pinions in the three series of diameters. Fig. 16 is a perspective view of the complete resetting-column, one portion being cut away to show the internal construction. Fig. 17 shows the same portions of the padlock which are shown in Fig. 16. In this Fig. 17 the bottom portion of the padlock is shown in vertical central section, the shank of the same being in elevation. Fig. 18 is a partial section of the resetting-column, showing a modification of a portion of mechanism of Fig. 16. Fig. 19 is a view of the same parts shown in Fig. 17. Fig. 20 is a side elevation of the finger-disk and the rod which it operates and a spring for reciprocating the finger-disk and the blade or teeth fixed to the rod and the screw-stop. Fig. 21 is a side elevation of the modified construction of those parts which are shown in Fig. 20, the relation of such modified construction to other portions of the mechanism being illustrated in Figs. 18 and 19. Fig. 22 shows the manner in which the catch secures the shell in a given position. Fig. 23 shows the shell when released from the catch to permit its rotation.

A indicates the shell of the padlock. This shell is preferably cylindrical in shape.

B indicates the staple provided with shanks $b'$ $b'$, adapted to enter the padlock.

The shell A of the padlock is interiorly provided with a partition $a'$. It is also provided with a cover D. This cover is secured in any suitable manner in the upper end of the padlock in the recess E of the shell. The preferred means for securing this cover in position consists of the screw-thread $d^3$, formed on its periphery and engaging a corresponding screw-thread on the interior of the recess E of the shell A. The partition $a'$ is also provided with openings $a^2$ $a^2$, and the cover D is provided with openings $d'$ $d'$. The ends of the openings $a^2$ $a^2$ are respectively located in given radii of a circle described through the longitudinal axis of the padlock, and the same is true as to the location of the openings $d'$ $d'$ of the cover, which are respectively located in the same radii and at the same distance from the said axis. Consequently when the cover is properly rotated in relation to the shell A the axis of one of the openings $d'$ will coincide with the axis of the adjacent opening $a^2$. The axis of the other opening $d'$ will coincide with the axis of the adjacent opening $a^2$. Through each of these opening $a^2$ $d'$ $a^2$ $d'$ respectively pass the shanks $b'$ $b'$ of the staple B when the lock is in use.

The base or basal disk C of the tumbler-operating column TOC is located at that end of the padlock which is opposite where the staple enters, and preferably constitutes, as shown, that end or head of the padlock.

The tumbler-operating column TOC carries the shank $C^4$, which latter passes through the center of the tumbler-disks, tumbler-rings, and tumbler-supports of the lock. These tumbler-disks, tumbler-rings, and tumbler-supports, of which a more particular description will be hereinafter given, are securely held between the partition $a'$ of the padlock-shell and a portion, as $C^2$, of the basal disk C. It is, however, desirable that the said tumbler-disk, tumbler-rings, and tumbler-supports be kept closely together by elastic pressure for the reason that it is desirable that each tumbler shall be so frictionally held that it shall not rotate unless positively operated through the agency of the pinion $k^9$ or blades $C^5$ of the shank $C^4$, hereinafter mentioned. One convenient mode of creating such friction consists as follows: Each of the tumbler-disks N is a little thicker than the depth of that depression in the tumbler-support K which is to receive it. Consequently when the series of said tumbler supports, rings, and disks are elastically brought together each tumbler-disk N will make frictional contact with the surfaces next it. Below and against the lowest tumbler-support K is a washer O. The latter is elastically pressed upward against the adjacent tumbler-support K, and thus the tumbler-disk N of this support presses against the bottom of the tumbler-support next above, and the tumbler-disk N of the latter support presses against the surface next above. In this way the desired frictional contact necessary to prevent the tumbler-disk from rotating, except as positively moved by the rotation of the pinion $k^9$, is accomplished.

The preferred means of keeping the washer O elastically pressed against the adjacent tumbler-supports consists of a spring $C^{10}$, preferably of a spiral shape. For holding the spring in place a recess, as $C^{12}$, in the bed $C^2$ of the tumbler-supporting column is present.

The base or basal disk C of the tumbler-operating column TOC is preferably provided with a shoulder $C'$. The lower edge of the padlock shell A rests against the inner face of the base C, and the shoulder $C'$ of the dial fits closely within the said shell of the padlock. By these means the padlock-shell A and the base C are firmly held together and cannot be displaced.

That portion of the shank $C^4$ which extends above and beyond the tumblers and tumbler-supports is provided with a screw-thread. This screw-threaded portion of the shank $C^4$ passes through the opening $a^4$ and projects beyond the partition $a'$. That portion of the shank $C^4$ which thus projects beyond the partition $a'$ receives an annular nut $C^{27}$, which is screwed upon the shank $C^4$ and occupies the recess $a^3$ in the upper part of the partition $a'$. To prevent this nut being unscrewed when the dial C is turned to unlock the padlock, any suitable means may be employed, the preferred means being as follows: The upper side of the circular nut $C^{27}$ is provided with grooves $C^6$ $C^6$, radial in their direction, and the upper end of the shank $C^4$ is likewise provided with the groove $C^7$, which latter, when the annular nut is properly turned, is coincident with those grooves $C^6$ of said nut which lie in the same diameter. A close-fitting key $C^9$ is then placed in the said grooves $C^6$ $C^7$, and thereby prevents the annular nut from turning upon the shank $C^4$ independently of the latter. In other words, the key $C^9$ compels the annular nut $C^{27}$ to turn with the shank $C^4$, and prevents the nut from unscrewing from the shank $C^4$ when the dial C is turned. The number of tumblers employed in the combination-lock of this padlock may be varied from two to any desired number. The number preferably employed is three, and the tumbler-supports K for the tumblers are respectively designated in Fig. 4 of the drawings by the letters G, H, and I, to distinguish their relative locations.

Suitable means are employed for preventing the chamber-tumblers from rotating. A novel and convenient means is shown in the drawings, and is as follows: Each of the tumbler-supports G, H, and I is provided at its periphery with a transverse recess or depression S, cut therein, substantially as shown in in Figs. 5 and 6. The inner side or wall of the padlock-shell A is provided with a ridge, feather, or equivalent projection $S'$, parallel to the axis of the shell, and this projection or ridge $S'$ fits into the recess S of the tumbler-supports. The ridge $S'$, being stationary, prevents these tumbler-supports from rotating within the shell. These tumbler-supports therefore, while being capable of being removed from the shell by sliding laterally within the shell when the dial-disk had been removed, are when in working position within said shell stationary therewith. The tumbler mechanism consists substantially of four parts—the tumbler-support K, the tumbler-ring F, the tumbler-disk N, and the operating-pinion $k^9$. The tumbler proper may be said to consist of the tumbler-disk N and the tumbler-ring F.

The tumbler-support K is provided with a central hole $k^4$, and in its upper side with a large circular depression $k^5$. At the bottom of this opening is an annular recess $k^6$, concentric with said support and made of a size to hold the annular ring F. In this way an annular shoulder $k^7$ is formed, the outside diameter of which corresponds to the inside diameter of the ring F. This annular shoulder $k^7$ is cut away at one point, as shown in Figs. 6 and 12, making an opening $k^8$, in which is located the small pinion $k^9$, whose spindle is journaled at $k^{10}$ in the support K. The said pinion meshes in the notches $f^2$ of the annular ring F, and operates to move said ring around the annular shoulder $k^7$ and in a direction concentric with said support K. This tumbler-support K is further provided with transverse openings $k^{12}$ $k^{12}$, which respectively receive the respective shanks $b'$ $b'$ of the staple. The tumbler-support K is also provided with two small pin-holes $k^3$ $k^3$, which, respectively, receive pins $k^2$ $k^2$ for pinning together all of the tumbler-supports and their accompanying tumbler-rings F and tumbler-disks N. The diameter of each annular ring F is substantially the same as the distance between the centers of the shanks $b'$ $b'$ of the staple B. The interior of the annular ring F is provided with a series of notches $f^2$, cut clear through the same. These notches $f^2$ bear any desired figures or characters.

In the exterior of the ring are two recesses $f'$ $f'$, not diametrically opposite one to the other, preferably semicircular in form, and which respectively register with the inner semicircular portions of the recesses $k'$ $k'$ in tumbler-support K. These semicircles $f'$ $k'$ when together form circular holes of the size of the staple-shanks $b'$ $b'$.

Each of the tumbler-disks N consists of an annular portion or ring. From the surface of this ring projects an annular shoulder $n^2$, designed to enter a central opening $k^4$ in the tumbler-support K next above and keep the tumbler-disk in position so that it can be properly rotated. From the annular shoulder $n^2$ of each disk N projects a stop or abutment $n'$, which also enters into said central opening $k^4$ of the tumbler-support K next above.

The following exception is to be noted, viz: The annular shoulder $n^2$ of the upper disk N and its stop or abutment $n'$ enter a central recess of the partition $a'$ of the shell A. The end of these stops or abutments $n'$ as the base C and the shanks $C^4$ are turned come into contact with the respective adjacent studs or carriers $C^5$ on the shank $C^4$.

Each of the disks N is provided with a stud or boss $n^4$, adapted to engage in any one of the notches $f^2$ of its respective annular ring F. This stud $n^4$ projects from and beyond the periphery of the disk. This stud $n^4$ can be placed in any one of the notches $f^2$ of the annular ring of the disk N, at the same time fitting closely within the opening in said ring and forming, together with the said ring, a solid compound tumbler. By turning the stud $n^4$ to a notch between any two of the figures the point at which the tumbler-ring will be turned, so as to enable its openings $f'$ in its periphery to coincide with the openings $k'$ of the tumbler-supports, will be fixed. The arrow $n^5$ on the tumbler N is merely a gage for setting the same, pointing to a number when the boss $n^4$ is in a notch $f^2$.

In each series the tumbler-support K is like those of the other series, and the annular ring F is substantially identical with those of the other series, and the disk N is similar to those of the other series. The numbering on each of the annular rings F is identical. In the illustrative instance this numbering is from one to twenty-four, inclusive.

Each of the shanks $b'$ $b'$ of the staple B is provided with recesses $b^2$ $b^2$, into which the edges of the adjacent tumblers respectively enter when the staple B is adjusted in the padlock and the latter is locked.

It will be observed that a plane passing through the axes of the holes $f'$ $k'$ will pass to the side of the axis of the shank $C^4$, which latter axis may be considered the axis of the padlock. This arrangement of these holes in relation to the axis of the padlock is intentional, I having invented it for preventing the concave openings $f'$ of the tumblers from coinciding with the openings $k'$ of the tumbler-carriers more than once in an entire revolution of the tumbler. This last-named arrangement is fully described and claimed in Letters Patent granted to me, July 1, 1890, No. 431,336. Were this arrangement not present the openings $f'$ of a tumbler would coincide with the openings $k'$ of the padlock twice in the course of a revolution of a tumbler, thereby allowing the said openings $f'$ of the tumblers to be more readily caused to coincide with the openings $k'$ of the tumbler and the lock to be more readily opened. The lock in such event could be opened on combinations other than the one on which it was set. My novel arrangement of the openings $f'$ $k'$, so that a plane passing through their axes is to one side the axis of the shank $C^4$, prevents what may be termed "false-setting" of the tumblers and the disadvantages resulting therefrom.

For the purpose of enabling the tumbler-chambers to always be adjusted in relation to one another in the proper position and for retaining them in a proper position in relation to each other after they have been adjusted I provide two pins $k^2$ $k^2$. Each of these pins is fixed in the lower or end tumbler I and is received in holes or openings $k^3$ in the other tumblers, substantially as shown in Figs. 5, 6, and 12. By placing the tumblers I, H, and G in their respective order within the shell, the pins $k^2$ being within the respective holes $k^3$ of the tumbler-chambers, the tumbler-supports will be in a proper position relatively to one another, and can only rotate, if at all, together. Their joint rotation is prevented by means of the recess S, heretofore described, and which when the tumblers are placed within the shell A of the padlock engages the ridge or feather S' of the said shell A.

In locking and unlocking the lock the tumblers in respect to one another operate in substantially the same manner as do the tumblers of other well-known combination-locks.

The mode and means whereby the combination of dial-movements may be changed are novel and exceedingly simple and permit the combination to be quickly and readily changed. This novel means for changing the combination will now be described.

The mechanism for operating the tumblers so as to open the lock and so as to break the combination, and thus close it, is contained within what may be called the "tumbler-operating column." The said column consists of the base $C^2$ $C^2$, consisting of a lower discal portion C, which extends without the shell of the padlock. Extending from this base in a line parallel to the axis thereof is a shank $C^4$. The said shank is divided into a series of rings $C^{28}$, which are separated one from another by a series of annular depressions or grooves $C^{13}$. Each groove is of a width corresponding with the thickness of a tumbler-ring F. The said shank $C^4$ is of a diameter sufficiently short to allow it to readily pass through the central openings in the tumbler-supports K and tumbler-disks N. The size of these grooves $C^{13}$ is sufficient to allow the pinions $k^9$ to operate in them. The under side of the base C $C^2$ contains a recess, into which fits a disk $C^{15}$. From the upper portion of disk $C^{15}$ extends a rod $C^{16}$, which extends nearly the entire length of the shank.

The shank $C^4$ has an axial perforation and the rod $C^{16}$ is present in the latter and is free to reciprocate therein. To prevent the rod slipping too far down in said perforation, I provide a suitable device, as follows: The shank has a circular recess $C^{17}$ in its top, and in this recess is a set-screw $C^{18}$, the head of which is too large to slip through that opening or perforation of the shank in which the rod $C^{16}$ reciprocates. The screw of the set-screw $C^{18}$ is screwed into the upper end of the rod $C^{16}$. The head of the set-screw is free to reciprocate vertically in said recess, but no farther. Hence the rod $C^{16}$ is always kept in position.

From the upper portion of the larger recess $C^{11}$ of the base C $C^2$ extends upwardly a small circular recess $C^{31}$ into the lower portion of the shank $C^4$, said recess being sufficiently large to admit a spiral spring $C^{20}$ around the rod $C^{16}$. In the shank $C^4$, from its lower portion in the recess $C^{14}$ to a point on a line with the lower side of partition $a'$ of the shell A, is cut a longitudinal recess $C^{24}$, taking out about a quarter of said shank cut from the exterior into the inner longitudinal aperture, in which rod $C^{16}$ is located.

Upon rod $C^{16}$ at its upper portion is located a blade $C^{19}$, extending therefrom. The exterior edge of the blade $C^{19}$ corresponds with the extreme diameter of the shank. The said blade has notches within it, the depth of each notch corresponding with each annular notch upon the shank. Thus the teeth $C^{29}$ are present. These teeth or spaces between said notches of the blade respectively correspond in vertical depth to the rings on said shank. The upper side of the base of the column contains a recess surrounding the shank of sufficient size to contain the spiral spring $C^{10}$, heretofore mentioned, of the annular recess $C^{12}$. At a point on each ring of said shank $C^4$ is located a stud $C^5$. The said studs $C^5$ are arranged in a longitudinal vertical line on said shank and in a position to engage the studs $n'$ on the tumbler-disks N. At one point on the periphery of the discal portion C of the base is located a catch $C^{21}$, said catch being held out by the spring $C^{22}$.

In the interior of the bottom portion of the shell are located a series of notches $A^3$ $A^4$ $A^5$, with which the catch engages. The spring forces the catch into that notch which may be opposite to said catch. Also at one point upon the exterior of the shell at the bottom, preferably at right angles to the axis of the staple, is located a stud $A^2$, which indicates the position of the notch $A^3$ in the shell, into which this catch $C^{21}$ is admitted. When the finger-disk $C^{15}$ and rod $C^{16}$ are held at their lowest position by the spiral spring $C^{20}$, the notches $C^{30}$ of the blade $C^{19}$ correspond to the notches $C^{13}$ in the shank. The projections $C^{29}$ of the blade are respectively in the same plane with the rings $C^{28}$ of the shank. The under side of disk $C^{15}$ is hollowed out, leaving a rib $C^{23}$ across it diametrically, affording a suitable hold for the thumb and finger in operating the said disk $C^{15}$.

The spiral spring $C^{20}$ exerts a pressure in two directions—viz., downwardly and circularly. The latter pressure is caused by one end of the spring being fastened in the upper portion of the disk $C^{15}$ and the other end being within the upper portion of the base $C^{22}$ of the tumbler-operating column. The pressure exerted in a circular direction by this spring $C^{20}$ upon the disk $C^{15}$ and its rod $C^{16}$ is sufficient to keep the blade $C^{19}$ and its projections $C^{29}$ of said rod over to one side of the longitudinal opening $C^{24}$.

The relative positions of the upper, middle, and lower tumblers when looking down upon them in plan view and considering them stripped of their accompaniments is shown in Fig. 15, where $k^9$ (a) indicates the upper tumbler, $k^9$ (b) the middle tumbler, and $k^9$ (c) the lower tumbler. It will be observed that while the tumblers are located at various heights in the lock yet they all lie in the vertically-extended plane of an arc whose radius is the center of the tumbler, substantially as shown in said Fig. 15.

The relation of these different parts in order to operate the combination is as follows:

When the catch $C^{21}$ is in the first notch $A^3$ in the shell A, the different parts are as shown in Fig. 4 of the drawings.

The mode of operating the lock is as follows: The parts are in the first place and before the lock is operated located as shown in Figs. 1, 4, and 16. It will be noted that at this time the catch $C^{21}$ is in the first notch $A^3$. The operator now takes hold of and presses the finger-disk $C^{15}$ upward till it assumes the position shown in Fig. 17. This movement brings the rod $C^{16}$, with blade $C^{19}$ and the teeth or projections $C^{29}$, upward till the latter are in the position shown in said Fig. 17—viz., so that the upper tooth $C^{29}$ meshes with the teeth of the pinion of the upper or first tumbler $k^9$ (a) in the plane of the dotted line 6 6 of Fig. 15. The operator then turns the finger-disk from left to right as far as it will turn. It will be recollected that the limit of this rotation is that part of a circle bounded by the walls of that notch or depression $C^{24}$ extending upward in the shank $C^4$. This movement of the upper tooth $C^{29}$ of the rod $C^{16}$ rotates the upper pinion $k^9$, and thus rotates the upper tumbler one number. The operator now releases his hold on the finger-disk $C^{15}$, and the spring $C^{20}$ returns the disk downward. After it is sufficiently down, so that the upper tooth of the rod $C^{16}$ is below said pinion, the torsional action of the spring $C^{20}$ rotates said disk in a reverse direction from that in which the operator turned it. Thus the disk $C^{15}$ is returned to its first position in readiness to be again operated. The number of times the above operation is to be repeated will depend upon the index or dial number at which the tumbler is set so as to open—that is, so that its openings will respectively be coincident with the shank-openings $a^2$ $d'$ at the upper end of the padlock. After this tumbler has been thus turned until it is set on the index-number at which its shank-openings correspond with the shank-openings in the diaphragm or partition $a'$ and in the cover D the operator then presses on the catch or latch $C^{21}$ and, thus moving the same inward, unlatches the disk C from the shell of the lock and turns said disk C, and with it rotates the tumbler-operating column from right to left until the catch $C^{21}$ engages the next notch—viz., notch $A^4$—in the shell. The plane of the teeth $C^{29}$ of the rod $C^{16}$ will now be in a plane passing through the dotted line 7 7. (Shown in Fig. 15.) The operator now moves the finger-disk upward, bringing the middle tooth $C^{29}$ in engagement with the pinion $k^9$ (b) in the plane of said dotted line 7 7. He now rotates the finger-disk from right to left and thus rotates this pinion and thereby rotates the middle tumbler—viz., the one in tumbler-support H—one number. Releasing his hold on the finger-disk $C^{15}$, the latter returns to its first position. He repeats this operation of the finger-disk $C^{15}$ until the middle tumbler is rotated to the desired number for which it is set. The upper and middle tumblers now being set so that their shank-openings are respectively coincident with each other and the shank-openings $a^2$ $d'$ of the shell of the lock, the operator now unlatches the catch $C^{21}$ and turns the disk C onward from right to left until the latch catches in the third notch—viz., notch $A^5$—of the shell. The teeth $C^{29}$ of the rod $C^{16}$ are now in the plane passing through the dotted line 8 8 of Fig. 15. The operator, by means of the finger-disk $C^{15}$ in the manner aforementioned, raises the said teeth, so that the lowest tooth $C^{28}$ engages the lowest pinion $k^9$ (c) (see Fig. 15) and then rotates the said pinion, and with it the lower tumbler located on the lower tumbler-support I, moving the tumbler forward one figure and then lets the finger-disk return to its first position, as aforementioned. He repeats the operation of the finger-disk $C^{15}$ until this tumbler is moved to the number at which it is set. The shank openings or notches $f'$ $k'$ will now be coincident with each other and with the openings $a^2$ $d'$ in the shell or envelope of the lock. At this time those portions of the discal rings F which, while the lock was locked, have hitherto been in the recesses $b^2$ of the shanks $b'$ $b'$, as shown in Fig. 4, are now no longer in the said recesses and there is no obstacle in the way of the shanks $b'$ $b'$ being withdrawn. The lock is now unlocked and the shanks $b'$ $b'$ of the staple or equivalent connections can now be withdrawn from the lock. To illustrate: If the combination on which the lock is set be "1," "3," "1," the catch $C^{21}$ is opposite the projection $A^2$. The operator operates the finger-disk $C^{15}$ once, then moves the disk C to the first notch or stop to the left of projection $A^2$, then operates the finger-disk three times, then moves the disk C to the second notch or stop to the left of projection A, and then operates the finger-disk $C^{15}$ once. The lock is now unlocked. When it is desired to again lock the lock or padlock, the operator returns the shanks $b'$ $b'$ or other equivalent connection or connections into the lock. To break the combination, he then unlatches the catch $C^{21}$ and rotates the disk C from left to right. This movement causes the tumbler-operating column TOC to be rotated from left to right, and the teeth or studs $C^5$ of the shank $C^4$, as the latter is rotated, respectively strike against their respective studs or projections $n'$ of the tumbler-disks N and thus turn the tumblers so that their respective shank-openings $f'$ are out of coincidence with the openings $a^2$ $d'$ of the shell of the lock, and a portion of the disk of each tumbler-ring F is inserted in the niche or notch of the shank $b'$ adjacent thereto. The lock is now locked and the shanks cannot be withdrawn. To set the lock in condition so that the tumblers may be set upon the combination and the lock again be unlocked, the rotation of disk C is continued from left to right one entire revolution and till the catch $C^{21}$ is opposite the index projection $A^2$. The studs or projections $n'$ are so located on the tumblers and with reference to the catch that in this last operation—viz., of rotating the disk C—the studs $C^5$ of the shank $C^4$ will respectively strike against said projections $n'$ and return the tumblers to the position they were in when this description of the mode of operating the lock was begun. The lock is now still locked, the tumbler-rings F engaging the shanks $b'$ $b'$, and is in readiness to be unlocked by operating the lock for the combination "1," "3," "1," as heretofore mentioned.

This lock is of especial advantage at night. Its construction and the mode in which it is unlocked and locked are such that the operator who knows the combination can readily operate it in the dark. Thus he can feel that catch $C^{21}$ is opposite to and in line with index projection $A^2$. He can then operate the finger-disk $C^{15}$ a given number of times. He can then unlatch the catch $C^{21}$ and turn the disk C till it is stopped by the latch entering the notch $A^4$. Furthermore, he can hear the click of the latch as it enters this notch. He can then operate the finger-disk $C^{15}$ the necessary number of times, and then turn the disk C until it again stops on reaching the notch $A^5$. Then operating the finger-disk $C^{15}$ the given number of times, the lock is now unlocked. The lock may also be locked and reset for unlocking by turning the disk till the latch $C^{21}$ is opposite index projection $A^2$ by the operator's touch upon the same. All of the above operations can be performed by the sense of feeling and without the aid of light of any kind. Hence this lock is valuable for many important purposes where locks that cannot be operated without light would be useless. In powder-magazines and certain descriptions of vaults my invention is invaluable. It is, moreover, always a great convenience to have a combination-lock that one can open in the dark as well as in the light. It is also a necessary description of lock for one whose sight is impaired or altogether gone.

In Figs. 18 and 19 is shown a modification of a portion of the mechanism shown in Fig. 16. This modification consists as follows: Instead of the finger-disk $C^{15}$ being rotatable, as it is shown in Figs. 16 and 17, it is non-rotatable. This rotation is prevented by means of guiding-pins T, fixed to the upper side of said disk. Each of these pins is located in and slides through an opening $T'$, there being one of these openings for each pin. On each of these pins is located a spiral spring $T^2$, the upper end of which spring is fastened to the wall of the orifice or opening $T'$, through which passes its pin T. The other end of the spring is located against the upper side of the finger-disk. As the finger-disk $C^{15}$ is pressed upward the springs $T^2$ are compressed, and as soon as the upward pressure on the said disks $C^{15}$ is removed the springs will operate to carry the disk downward to its first position. The lower end of the rod $C^{16}$ in the present instance is not rigidly connected to the disk $C^{15}$ but enters a central orifice in the disk $C^{15}$ and slides up and down therein. Suitable means for causing the vertical movement of the disk $C^{15}$ to rotate the said shank $C^4$ are to be employed, and a preferred description of such means is as follows: A spiral guideway $C^{25}$ is located in the disk $C^{15}$ around and in conjunction with the vertical central opening in said disk $C^{15}$. A pin or stud $C^{26}$ is rigidly fixed upon the rod $C^{16}$ and extends into the spiral guideway $C^{25}$. The inclination or length of the spiral guideway $C^{25}$ is such that when the disk $C^{15}$ is vertically moved as far upward as the upper end of the recess $C^{14}$ the said spiral guideway will, by means of the said studs $C^{26}$ and the said shank, impart to the blade, and through it the tumbler, the requisite amount of rotation. The position of the parts when the disk $C^{15}$ is thus elevated is shown in Fig. 19. When the disk $C^{15}$ descends, the shank $C^4$, by means of the said guideway $C^{25}$ and said stud $C^{26}$, will be returned to its first position, (shown in Fig. 18,) and the parts will be in readiness to be operated in the manner hereinbefore described for the rotation of another tumbler.

While the various features of my invention are preferably employed together, one or more of the said features may be used without the remainder, and in so far as applicable one or more of the said features may be used in connection with combination-locks of a description other than the one herein specifically specified.

What I claim as new and of my invention, and desire to secure by Letters Patent, is—

1. In a combination-lock, the combination of two or more tumblers, each tumbler consisting of tumbler-disk N, tumbler-ring F, and tumbler-support K, united together substantially as described, the tumbler-support being provided with the pinion $k^9$, arranged to mesh with the notches or teeth $f^2$ of the tumbler, and the rod $C^{16}$, provided with the projecting teeth $C^{29}$, and mechanism, substantially as described, for enabling the rod $C^{16}$ to be longitudinally reciprocated for bringing said teeth $C^{29}$ into contact with their respective pinions $k^9$ and for rotating the rod $C^{16}$, substantially as and for the purposes specified.

2. In a combination-lock, the combination of two or more tumblers, each tumbler consisting of tumbler-disk N, tumbler-ring F, and tumbler-support K, united together substantially as described, and a tumbler-operating column having rod $C^{16}$, carrrying teeth $C^{29}$, and the finger-disk $C^{15}$, arranged to move to and from the tumblers provided with mechanism for enabling the rotation of the said disk when at one end of its reciprocal movement to rotate a given tumbler, substantially as and for the purposes specified.

3. In a combination-lock, the combination of two or more tumblers, each tumbler consisting of tumbler-disk N, tumbler-ring F, and tumbler support K, united together substantially as described, and tumbler-operating column having rod $C^{16}$, carrying teeth $C^{29}$, and the finger-disk $C^{15}$, arranged to move to and from the tumblers provided with mechanism for enabling the rotation of the said disk when at one end of its reciprocal movement to rotate a given tumbler and provided with means, substantially as described, for elastically returning the disk after a given tumbler has been returned to its first position, substantially as and for the purposes specified.

4. In a combination-lock, the combination of two or more tumblers, each tumbler consisting of tumbler-disk N, tumbler-ring F, and tumbler-support K, united together substantially as described, and a tumbler-operating column having rod $C^{16}$, carrying teeth $C^{29}$, and the finger-disk $C^{15}$, arranged to move to and from the tumblers provided with mechanism for enabling the rotation of the said disk when at one end of its reciprocal movement to rotate a given tumbler and provided with spring $C^{20}$, embracing the rod $C^{16}$, fastened substantially as described, substantially as and for the purposes specified.

5. In a combination-lock, the combination of two or more tumblers, each tumbler consisting of tumbler-disk N, tumbler-ring F, and tumbler-support K, united together substantially as described, and the rod $C^{16}$, provided with teeth $C^{29}$, engaging the pinions $k^9$, the rod $C^{16}$, reciprocating through the said shank and the disk $C^{15}$, connected to the rod, the disk $C^{15}$ being capable of reciprocal movement to and from the tumblers, substantially as described, and spring for elastically returning finger-disk $C^{15}$ to its first position, substantially as and for the purposes specified.

6. In a combination-lock, the combination of two or more tumblers, each tumbler consisting of tumbler-disk N, tumbler-ring F, and tumbler-support K, united together substantially as described, and rod $C^{16}$, provided with teeth $C^{29}$, engaging their respective adjacent pinions $k^9$, the rod $C^{16}$, reciprocating through the shank and the reciprocating disk $C^{15}$, and means, substantially as described, for enabling the reciprocatory movement of the disk to rotate the rod, substantially as and for the purposes specified.

7. In a combination-lock, the combination of two or more tumblers, each tumbler consisting of tumbler-disk N, tumbler-ring F, and tumbler-support K, united together substantially as described, and rod $C^{16}$, provided with teeth $C^{29}$, engaging their respective adjacent pinions $k^9$, the rod $C^{16}$, reciprocating in the shank $C^4$, and finger-disk $C^{15}$, located in the recess $C^{14}$ at the end of the bed-foundation portion of the tumbler-operating column connected to the rod by mechanism, substantially as described, for enabling the said finger-disk $C^{15}$, when reciprocated and turned, to rotate the rod and move the teeth $C^{29}$, substantially as and for the purposes specified.

8. In a combination-lock, the combination of two or more tumblers, each tumbler consisting of tumbler-disk N, tumbler-ring F, and tumbler-support K, united together substantially as described, and rod $C^{16}$, provided with teeth engaging their respective adjacent pinions $k^9$, the rod $C^{16}$, reciprocating in the shank $C^4$, and the disk $C^{15}$, located in the recess $C^{14}$ and rigidly connected to the said rod $C^{16}$, and provided with spring $C^{20}$, substantially as and for the purposes specified.

9. The series of tumblers having central openings through which passes an operating rotatable reciprocating shaft having projections, in combination with pinions for successively operating the tumblers, one of the said projections when the shaft has been reciprocated in one direction and rotated a given distance engaging with one of the said pinions, the said projections when the shaft has been reciprocated in the opposite direction being out of engagement with the said pinions, substantially as and for the purposes specified.

10. The combination of the catch $C^{21}$, and the disk C, and tumbler-operating column having shank $C^4$, having two or more projections $C^5$, and the tumblers having projections $n'$, and the shell having notches, as $A^3 A^4 A^5$, substantially as and for the purposes specified.

11. The combination of the catch $C^{21}$, and the disk C, and tumbler-operating column having shank $C^4$, having two or more projections $C^5$, and the tumblers having projections $n'$, and the shell having notches, as $A^3 A^4 A^5$, and the reciprocating rod $C^{16}$, having teeth $C^{29}$, and finger-disk $C^{15}$, and elastic mechanism for returning the spring to its first position after being operated, and pinions, as $k^9$, located substantially as described, substantially as and for the purposes specified.

12. The combination of the catch $C^{21}$, and the disk C, and tumbler-operating column, having shank $C^4$, having two or more projections $C^5$, and the tumblers having projections $n'$, and the shell having notches, as $A^3 A^4 A^5$, and the reciprocating rod $C^{16}$, having teeth $C^{29}$, and finger-disk $C^{15}$, and spring $C^{20}$, located in connection with rod $C^{16}$ and pinions, as $k^9$, located substantially as described, substantially as and for the purposes set forth.

13. The combination of the tumbler-supports and the tumblers, each tumbler made thicker than the depth of its seat in the tumbler-support, and the envelope or shell in which said tumblers and their supports are contained, and the spring $C^{10}$, bearing against a fixed portion of the lock and against the bottom of the end tumbler-support, substantially as and for the purposes set forth.

14. The combination of the tumbler-supports and the tumblers, each tumbler made thicker than the depth of its seat in the tumbler-support, and the envelope or shell in which said tumblers and their supports are contained, and the spring $C^{10}$, compressed between a fixed portion of the shell and a part of the tumbler mechanism for creating frictional contact beween the tumblers, substantially as and for the purposes set forth.

15. The combination of the tumbler-supports and the tumblers, each tumbler made thicker than the depth of its seat in the tumbler-support, and the envelope or shell in which said tumblers and their supports are contained, and the spring $C^{10}$, one end bearing against the end C of the shell and the other end of the spring pressing up the bottom side of the lower tumbler-support, substantially as and for the purposes set forth.

16. The combination of the tumbler-supports and the tumblers, each tumbler made thicker than the depth of its seat in the tumbler-support, and the envelope or shell in which said tumblers and their supports are contained, and the spring $C^{10}$, one end located in a depression $C^{12}$ in the end C of the shell and pressing the tumbler devices together, substantially as and for the purposes set forth.

17. The combination of the tumbler-supports and the tumblers, each tumbler made thicker than the depth of its seat in the tumbler-support, and the envelope or shell in which said tumblers and their supports are contained, and the spring $C^{10}$, one end located in a depression $C^{12}$ in the end C of the shell, and the washer O, against which the other end of the spring bears, this washer being below the lower tumbler-support, substantially as and for the purposes specified.

18. The combination of the tumbler-supports and the tumblers, each tumbler made thicker than the depth of its seat in the tumbler-support, and the envelope or shell in which said tumblers and their supports are contained, and the spring $C^{10}$, bearing against a fixed portion of the lock and against the bottom of the end tumbler-support, each tumbler having projections, as $n'$, and the shank $C^4$, having projections $C^5$ for respectively engaging the projections, as $n'$, of the tumblers, and the rotatable disk C, connected to the shank and having catch $C^{21}$, engaging a fixed portion of the lock, and mechanism for rotating each tumbler to a given number, substantially as and for the purposes specified.

19. The combination of the tumbler-supports and the tumblers, each tumbler made thicker than the depth of its seat in the tumbler-support, and the envelope or shell in which said tumblers and their supports are contained, and the spring $C^{10}$, bearing against a fixed portion of the lock and against the bottom of the end tumbler-support, each tumbler having projections, as $n'$, and the shank $C^4$, having projections $C^5$ for respectively engaging the projections, as $n'$, of the tumblers, and the rotatable disk C, connected to the shank and having catch $C^{21}$, and a fixed portion of the lock having as many notches as there are tumblers, the notches being adapted to receive the said catch, and mechanism for rotating each tumbler to a given number, substantially as and for the purposes specified.

20. The combination of the tumbler-supports and the tumblers, each tumbler made thicker than the thickness of its tumbler-support, and the envelope or shell in which said tumblers and their supports are contained, and the spring $C^{10}$, bearing against a fixed portion of the lock and against the bottom of the end tumbler-support, each tumbler having projections, as $n'$, and the shank $C^4$, having projections $C^5$ for respectively engaging the projections, as $n'$, of the tumblers, and the rotatable disk C, connected to the shank and having catch $C^{21}$, and a fixed portion of the lock having as many notches as there are tumblers, the notches being adapted to receive the said catch, and rod $C^{16}$, having teeth $C^{21}$ and connected to finger-disk and reciprocating with the length of the shank, and mechanism for enabling the movement of the teeth of the rod $C^{16}$ to rotate the tumblers, substantially as and for the purposes specified.

21. The combination of the tumbler-supports and the tumblers, each tumbler made thicker than the thickness of its tumbler-support, and the envelope or shell in which said tumblers and their supports are contained, and the spring $C^{10}$, bearing against a fixed portion of the lock and against the bottom of the end tumbler-support, each tumbler having projections, as $n'$, and the shank $C^4$, having projections $C^5$ for respectively engaging the projections, as $n'$, of the tumblers, and the rotatable disk C, connected to the shank and having catch $C^{21}$, and a fixed portion of the lock having as many notches as there are tumblers, the notches being adapted to receive the said catch, and rod $C^{16}$, having teeth $C^{21}$, and connected to finger-disk and reciprocating with the length of the shank, and pinions, as $k^9$, for respectively operating the tumblers and for engagement with the teeth of rod $C^{16}$, substantially as and for the purposes specified.

22. The combination of the tumbler-supports and the tumblers, each tumbler made thicker than the thickness of its tumbler-support, and the envelope or shell in which said tumblers and their supports are contained, and the spring $C^{10}$, bearing against a fixed portion of the lock and against the bottom of the end tumbler-support, each tumbler having projections, as $n'$, and the shank $C^4$, having projections $C^5$ for respectively engaging the projections, as $n'$, of the tumblers, and the rotatable disk C, connected to the shank and having catch $C^{21}$, and a fixed portion of the lock having as many notches as their are tumblers, the notches being adapted to receive the said catch, and rod $C^{16}$, having teeth $C^{21}$, and connected to finger-disk and reciprocating with the length of the shaft, and pinions, as $k^9$, for respectively operating the tumblers and for engagement with the teeth of rod $C^{16}$, and mechanism for retracting the rod to its original position, substantially as and for the purposes specified.

23. The combination of the shank $C^4$, fixed to the rotatable disk C, and having notch or recess $C^{24}$ and teeth $C^5$, and tumblers having projections, as $n'$, for respective engagement with said teeth $C^5$, and rod $C^{16}$, reciprocating in the shank and having teeth $C^{29}$ on blade $C^{19}$, and mechanism for enabling the said teeth $C^{29}$ as rod $C^{16}$ is turned to rotate the tumblers, substantially as and for the purposes specified.

24. The combination of the shank $C^4$, fixed to the rotatable disk C, and having notch or recess $C^{24}$, and teeth $C^5$, and tumblers having projections, as $n'$, for respective engagement with said teeth $C^5$, and rod $C^{16}$, reciprocating in the shank and having teeth $C^{29}$ on blade $C^{19}$, and pinions, as $k^9$, for engaging said tumblers, and also said teeth $C^{29}$, as rod $C^{16}$ is rotated, the sides of notch $C^{24}$ limiting the rotation of the blade $C^{19}$, and thereby limiting the rotation of the said teeth $C^{29}$, substantially as and for the purposes specified.

25. The combination of the tumbler-supports and the tumblers, each tumbler made thicker than the depth of its seat in the tumbler-support, and the envelope or shell in which said tumblers and their supports are contained, and elastic mechanism bearing against one portion of the lock, and arranged to press the tumbler devices against each other, substantially as and for the purposes specified.

HENRY H. DANIELS.

Attest:
A. L. HENNLINGER,
K. SMITH.